United States Patent
Nakayama et al.

(10) Patent No.: US 6,560,365 B1
(45) Date of Patent: May 6, 2003

(54) DECODING APPARATUS AND METHOD

(75) Inventors: Tadayoshi Nakayama, Tokyo (JP); Hiroshi Kajiwara, Inagi (JP); Takeshi Yamazaki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/413,022

(22) Filed: Oct. 6, 1999

(30) Foreign Application Priority Data

Oct. 6, 1998 (JP) ............................................. 10-284122

(51) Int. Cl.$^7$ ................................................. G06K 9/36
(52) U.S. Cl. ........................ 382/233; 382/238; 382/239
(58) Field of Search ................................ 382/232–233, 382/234, 238, 239, 240, 244–246, 250, 251, 166, 248; 375/240.03, 240.11, 240.12, 240.18, 240.19, 240.23, 240.24, 240.25, 240.2; 341/65, 67, 107, 50; 358/476, 539

(56) References Cited

U.S. PATENT DOCUMENTS

| | | | |
|---|---|---|---|
| 5,581,373 A | 12/1996 | Yoshida | 358/476 |
| 5,751,860 A * | 5/1998 | Su et al. | 382/244 |
| 5,764,374 A * | 6/1998 | Seroussi et al. | 382/244 |
| 5,801,650 A | 9/1998 | Nakayama | 341/67 |
| 5,818,970 A | 10/1998 | Ishikawa et al. | 382/248 |
| 5,841,381 A | 11/1998 | Nakayama | 341/67 |
| 5,945,930 A | 8/1999 | Kajiwara | 341/50 |
| 5,986,594 A | 11/1999 | Nakayama et al. | 341/107 |
| 6,028,963 A | 2/2000 | Kajiwara | 382/239 |
| 6,031,938 A | 2/2000 | Kajiwara | 382/239 |
| 6,173,078 B1 * | 1/2001 | Kadono | 382/238 |

* cited by examiner

*Primary Examiner*—Phuoc Tran
*Assistant Examiner*—Ishrat I Sherali
(74) *Attorney, Agent, or Firm*—Fitzpatrick, Cella, Harper & Scinto

(57) ABSTRACT

It is one objective of the present invention to provide an arrangement for employing peripheral pixels to perform fast decoding, and in particular to perform fast decoding while taking into account the timing whereat the values of peripheral pixels are obtained. To achieve this objective, a decoding apparatus, which decodes each pixel based on a plurality of peripheral pixels, comprises: a plurality of memories, each of which corresponds to a set of first and second statuses that are obtained from a specific pixel and which is used to store a predetermined parameter that is required for decoding; determination means for determining read addresses in the plurality of memories based on a third status obtained from peripheral pixels other than the predetermined peripheral pixel; and selection means for receiving the first and the second statuses obtained from the predetermined pixel and for selecting one of the plurality of memories in accordance with the first and second statuses that are received.

5 Claims, 6 Drawing Sheets

| DIFFERENCE VALUE | QUANTIZING VALUE |
|---|---|
| Th3—255 | 4 |
| Th2—Th3-1 | 3 |
| Th1—Th2-1 | 2 |
| 1—Th1-1 | 1 |
| 0 | 0 |
| -Th1+1—-1 | -1 |
| -Th2+1—-Th1 | -2 |
| -Th3+1—-Th2 | -3 |
| -255—-Th3 | -4 |

FIG. 6

| k PARAMETER \ INTEGER VALUE V | 0 | 1 | 2 | 3 | 4 | ... |
|---|---|---|---|---|---|---|
| 0 | 1 | 01 | 001 | 0001 | 00001 | ... |
| 1 | 01 | 11 | 001 | 101 | 0001 | ... |
| 2 | 001 | 011 | 101 | 111 | 0001 | ... |

DECODING APPARATUS AND METHOD

BACKGROUND OF THE INVENTION

1. Field of the Invention

The present invention relates to a decoding apparatus and method for decoding compressed image data.

2. Related Background Art

Recently, there has been an increase in the number of applications for compressing static images as image data and for externally transmitting the compressed image data, or for storing it in a memory. For these purposes, it is preferable that lossless compression and encoding be used, especially when the data is for static images used for medical purposes, so that no deterioration of image quality occurs.

Accordingly, various efficient lossless compression and encoding methods have been proposed. For example, a lossless compression and encoding method has been proposed for outputting a difference between a pixel to be encoded and a predicted value generated by using peripheral pixels, and for performing Golomb-Rice coding for this difference.

With this method, when decoding is performed, the original value of the object pixel is reconstructed by adding the value of each difference to a predicted value that is generated based on the decoded values for peripheral pixels.

However, a specific apparatus configuration for decoding coded data has not yet been established.

SUMMARY OF THE INVENTION

To resolve this problem, it is one objective of the present invention to provide an arrangement for employing the above described peripheral pixels to perform fast decoding, and in particular to perform fast decoding while taking into account the timing whereat the values of peripheral pixels are obtained.

To achieve the above objective, according to the present invention a decoding apparatus, which decodes each pixel based on a plurality of peripheral pixels (corresponding to a, b, c and d in the preferred embodiments), comprises:

- a plurality of memories (corresponding to memories 202 to 210), for storing a predetermined parameter (corresponding a k parameter or a parameter Cα) necessary for decoding, which corresponds to a set of first and second statuses (corresponding to |Q3| and R3) that are obtained from a specific pixel (corresponding to pixel a);
- a determination units (corresponding to a status generating unit 103 that generates |Q2|) for determining a read address in the plurality of memories based on a third status (corresponding to |Q2|) obtained from peripheral pixels (corresponding to b, c and d) other than the predetermined peripheral pixel; and
- a selection unit (corresponding to memories 202 to 210 and a selector 211) for inputting the first and the second statuses obtained from the predetermined pixel and for selecting one of the plurality of memories in accordance with the inputted first and second statuses.

The other objectives and features of the present invention will become apparent during the course of the explanation for the following embodiments, given while referring to the accompanying drawings.

BRIEF DESCRIPTION OF THE DRAWINGS

FIG. 6 is a diagram showing the relationship between a Golomb-Rice code and an integer value V before encoding.

DETAILED DESCRIPTION OF THE PREFERRED EMBODIMENTS

The preferred embodiments of the present invention will now be described.

First Embodiment

A first embodiment of the present invention will now be described in detail while referring to the accompanying drawings.

Figure 1:
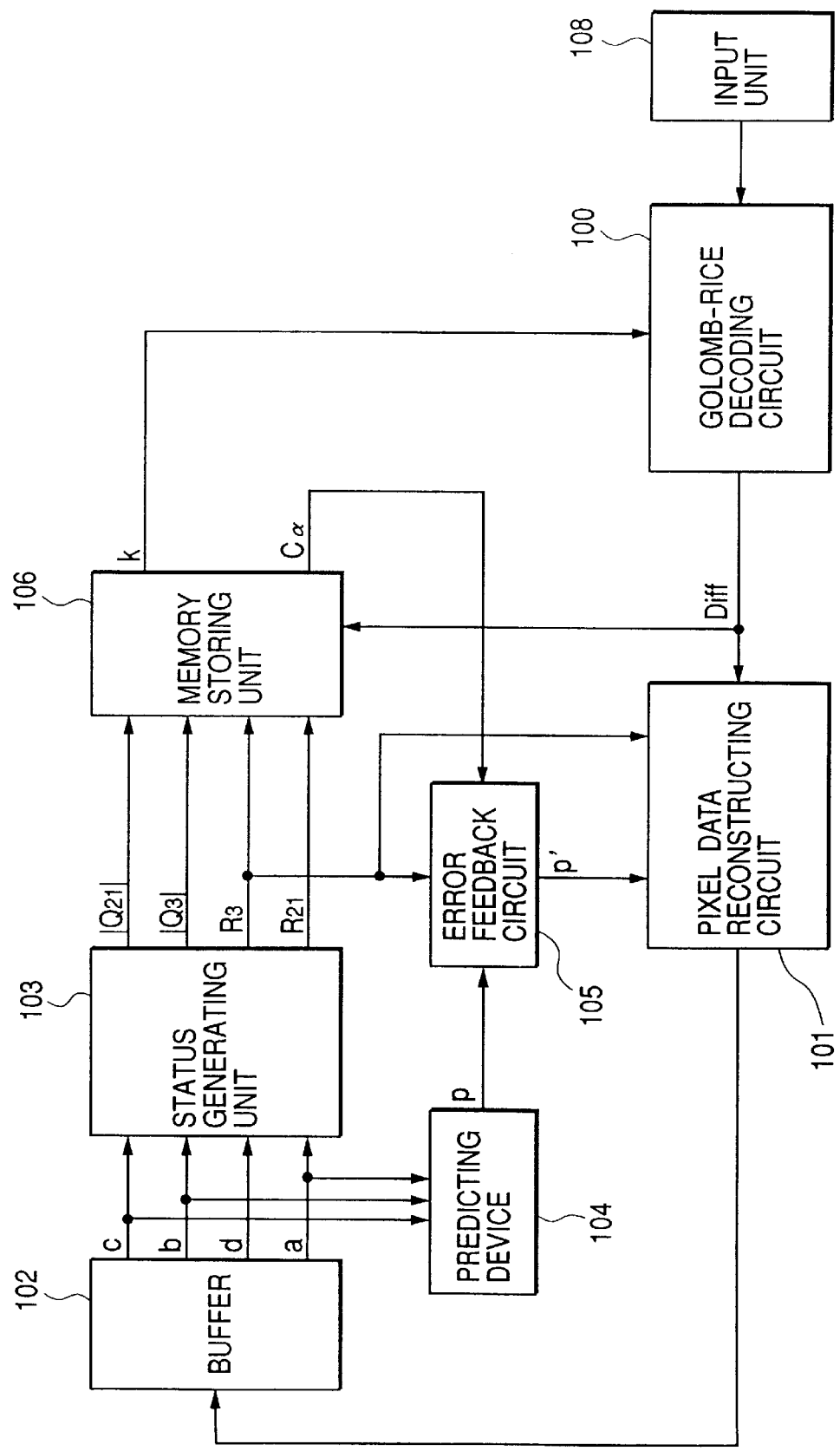
FIG. 1 is a block diagram illustrating a decoding apparatus.

FIG. 1 is a main block diagram for carrying out the first embodiment of the present invention. In FIG. 1, an input unit 108 receives coded data and sequentially supplies them to a succeeding stage.

The process used for generating coded data will be described later.

A Golomb-Rice decoding circuit 100 receives coded data from the input unit 108, and decodes the data to obtain difference data based on a k parameter received from a memory storing unit 106, which will be described later.

A pixel data reconstructing circuit 101 reconstructs pixel data based on the difference data received from the Golomb-rice decoding circuit 101, and on a parameter that will be described later.

A buffer 102 is used to store the pixel data obtained by the pixel data reconstructing circuit 101 as a peripheral pixel for the next object pixel x to be decoded. Image data for two lines, a line in which an object pixel is present and its preceding line, are stored in the buffer 102.

A status generating unit 103 employs the image data stored in the buffer 102 to generate various statuses that are required to decode the object pixel x.

A predicting device 104 employs the image data stored in the buffer 102 to generate a predicted value that is required to decode the object pixel x.

An error feedback circuit 105 appropriately corrects a predicted value, output by the predicting device 401, that is based on the difference data that are generated when the pixels prior to the object pixel x were decoded.

The memory storing unit 106 employs the information received from the status generating unit 103 and the difference data received from the pixel data reconstructing circuit 101 to generate, or to sequentially update, parameters that are required for the error feedback circuit 105 and the Golomb-Rice decoding circuit 100. The internal arrangement of the memory storing unit 106, which includes a plurality of memories, will be described in detail later.

The operations of the individual sections in this embodiment will be described by using a decoding example for a monochrome image signal when eight bits are used for one pixel (a value of 0 to 255). I should be note, however, that the present invention is not limited to this example, and can also be applied for the decoding performed for a multi-valued color image that is composed of RGB color components of 8 bits each, or of Lab luminance and chromaticity components of 8 bits each. In this case, each component need only be decoded in the same manner as that used for the monochrome image signal.

First, coded data for a pixel x to be decoded (hereinafter referred to as an object pixel x) is received by the input unit 108 in the coding order (in the order used for raster scanning in this embodiment), and are transmitted to the Golomb-Rice decoding circuit 100 at the succeeding stage.

The pixel values that are reconstructed by the decoding are sequentially input to the buffer 102, and are stored and held in two lines. Since there is no preceding line for the first line of an image to be decoded, the initial value in the buffer 102 is set to 0.

Then, from the image data held in the two lines stored in the buffer 102, the reconstructed pixel values a, b, c and d, which correspond to the peripheral pixels of the object pixel x that is to be decoded by the pixel data reconstructing circuit 101, are output to the succeeding stage. It should be noted, that since lossless coding is used to obtain the coded data in this embodiment, the reconstructed pixel values are exactly the same as the original pixel values used for the encoding.

Figures 3, 4:
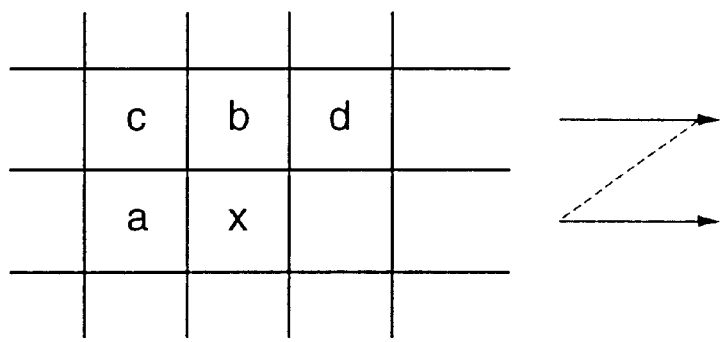
FIG. 3 is a diagram showing the positional relationship between an object pixel to be decoded (encoded) and peripheral pixels used for decoding (encoding)
FIG. 4 is a diagram showing a difference between peripheral pixels and a corresponding quantizing values.

FIG. 3 is a diagram showing the positional relationship of the object pixel x and the peripheral pixels having the pixel values a, b, c and d. In this embodiment, pixel data are reconstructed in the order indicated by the arrows. Thus, it is apparent that the pixel values c, b, d and a are stored in the named order in the buffer 102. The peripheral pixels are decoded pixels, and since the pixel values c, b and d are those for the preceding line of the object pixel x, they can be output from the buffer 102 at an early stage. Whereas, since the pixel value a is a pixel that was reconstructed immediately before the object pixel x, the pixel value a must be output from the buffer 102 immediately after it is stored there. The pixel value a is to be employed as the pixel value d, b or c.

The pixel values a, b, c and d are transmitted from the buffer 102 to the status generating unit 103, while the pixel values a, b and c are transmitted to the predicting device 401.

The status generating unit 103 generates a status number |Q21| that represents the status of the peripheral pixels of the object pixel x; a phase flag R21 that represents the phase of the status number |Q21|; a status number |Q3|; and a phase flag R3 that represents the phase of the status number |Q3|, and outputs them to the succeeding stage.

The method used for generating the status numbers and the phase flags will now be described.

The status number |Q21| is generated based on the pixel values d, b and c. Specifically, (d−b) and (b−c) are calculated, and are quantized to obtain nine levels, −4, −3, −2, −1, 0, 1, 2, 3 and 4, in accordance with the correlations shown in FIG. 4 to obtain quantizing values q(d−b) and q(b−c). Then, |Q21| is obtained by the calculation formula $|Q21|=|q(d-b)\times 9+q(b-c)|$.

The phase flag R21 is set to 0 when the result of $q(d-b)\times 9+q(b-c)$, i.e., the value of Q21, is positive, while the phase flag R21 is set to 1 when the value of Q21 is negative.

Through this processing, the status number |Q21| having a value of 0 to 40, and the phase flag R21 having a value of 0 or 1 are generated.

The status number |Q3| is generated based on the pixel values c and a. Specifically, (c−a) is calculated, and is quantized to obtain nine levels, −4, 3, −2, −1, 0, 1, 2, 3 and 4, in accordance with the correlation shown in FIG. 4 to obtain a quantizing value q(c−a). Then, |Q3| is obtained using the calculation formula $|Q3|=|q(c-a)|$.

The phase flag R3 is set to 0 when the result q(c−a), i.e., the value of Q3, is positive, while the phase flag R3 is set to 1 when the value Q3 is negative.

Through the above processing, the status number |Q3| having a value of 0 to 4 and the phase flag R3 having a value of 0 or 1 are generated.

Of the four parameters, parameters |Q21| and R21 can be output at an early stage, while |Q3| and R3, which are generated using the immediately preceding pixel value a, are output later.

The operation performed by the memory storing unit 106 will now be described in detail while referring to FIG. 2.

Figure 2:
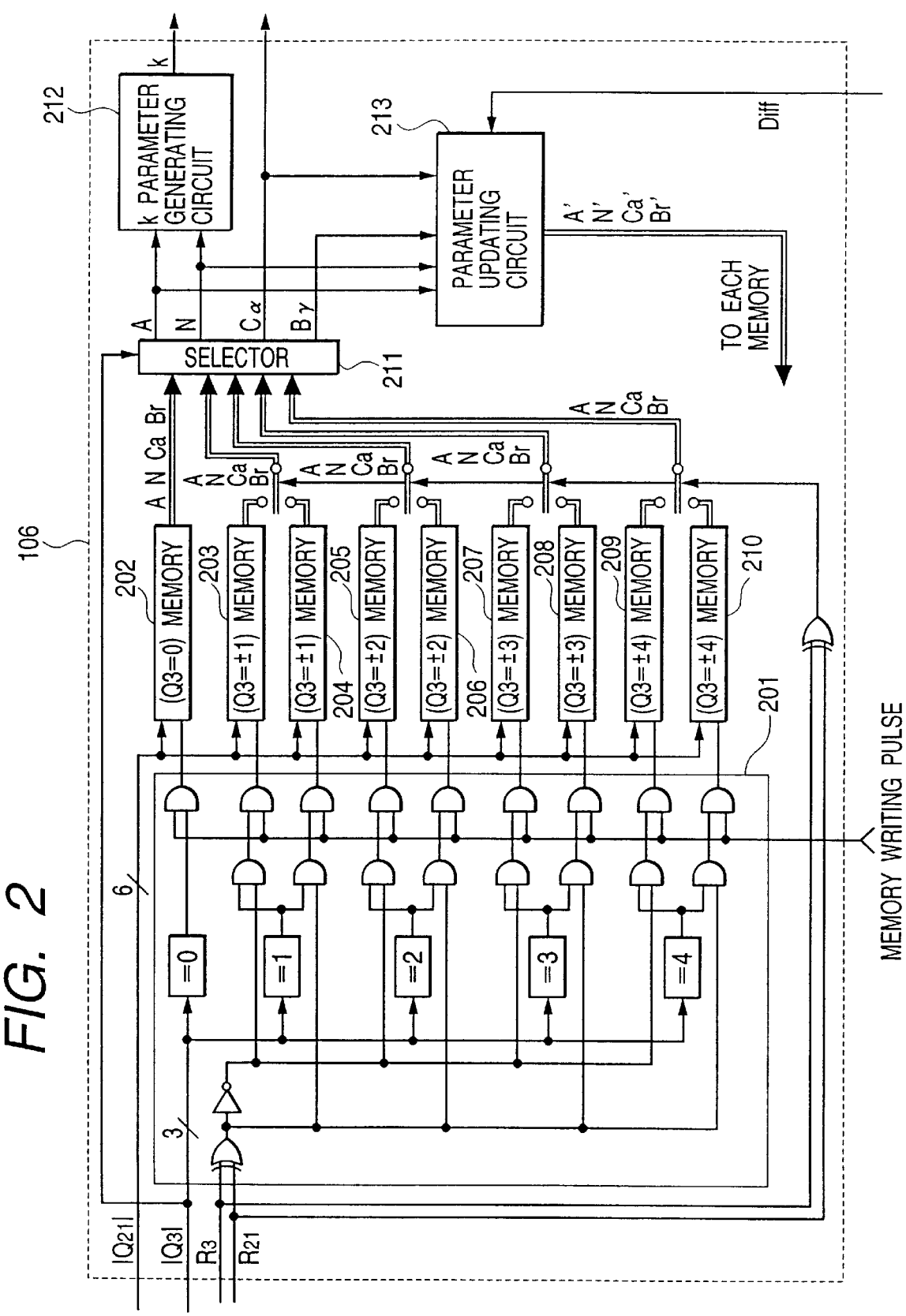
FIG. 2 is a detailed diagram showing a memory storing unit.

In FIG. 2, the memory storing unit 106 comprises: a memory write control unit 201, memories 202 to 210, a selector 211, a k parameter generating circuit 212, and a parameter updating circuit 213.

Each of the memories 202 to 210 is used to store parameters A and N that are employed to generate a k parameter, which is to be used by the Golomb-Rice decoding circuit 100 at the succeeding stage; a parameter Cα that is used by the error feedback circuit 105; and a parameter Bγ that is required for generating the parameter Cα.

The parameter A is the sum of the absolute values of the prediction differences Diff for the status number S, which is uniquely determined based on all the values a, b, c and d of the peripheral pixels. The parameter N is the number of times the status number S was generated. The parameter Bγ is the sum of the prediction differences for the status number S. The parameter Cα is a correction value for correcting a predicted value for each status number S. And the status number S corresponds to a value of $|q(c-a)\times 81+q(d-b)\times 9+q(b-c)|$.

In this embodiment, the parameters A, N, Cα and Bγ are managed in the different memories 202 to 210 for each of nine separate statuses obtained by dividing the status number S in accordance with the status number Q3, i.e., for each of nine statuses obtained by dividing the status number |Q21| based on the status number Q3, so that in each memory the reading and writing of these parameters, based on the status number |Q3| that is input after the status number |Q21|, can be performed in parallel. With this arrangement, the parameter writing and reading procedures based on the status number S can be performed at a high speed. That is, since the parameters A, N, Cα and Bγ that are expected to be read are extracted before the reconstruction of the value a of the immediately preceding pixel of the object pixel x, an appropriate parameter can be output as soon as the pixel value a is obtained.

In FIG. 2, the status number |Q21| is input as a 6-bit address signal indicating a value of 0 to 40.

Since the address signal |Q21| is equally distributed to all the memories, a parameter at an address corresponding to the address signal is read in parallel from the individual memories.

Nine sets, each of which is composed of parameters A, N, Cα and Bγ, are read from the nine memories, and one of them is selected by using the status number |Q3| and the phase flags R21 and R3.

Specifically, when |Q3|=0, the parameters read from the first memory 202 are selected.

When |Q3|=1 and the phase flag R21=the phase flag R3, the parameters read from the second memory 203 are selected. When |Q3|=1 and the phase flag R21≠the phase flag R3, the parameters read from the third memory 204 are selected.

When |Q3|=2 and the phase flag R21=the phase flag R3, the parameters read from the fourth memory 205 are selected. When |Q3|=2 and the phase flag R21≠the phase flag R3, the parameters read from the fifth memory 206 are selected.

When |Q3|=3 and the phase flag R21=the phase flag R3, the parameters read from the sixth memory 207 are selected. When |Q3|=3 and the phase flag R21≠the phase flag R3, the parameters read from the seventh memory 208 are selected.

When |Q3|=4 and the phase flag R21=the phase flag R3, the parameters read from the eighth memory 209 are selected. When |Q3|=4 and the phase flag R21≠the phase flag R3, the parameters read from the ninth memory 210 are selected.

The above selection process is performed by the selector 211 while switching between the memories 202 to 210. At the succeeding stage, the parameters A, N, Cα and Bγ corresponding to one selected status number S are output to the k parameter generating circuit 212, the parameter updating circuit 213 or the error feedback circuit 105.

The parameter updating circuit 213 receives the four parameters N, A, Bγ and Cα in the selected status number S, and updates them to parameters N', A', Bγ' and Cα'.

Specifically, based on the difference Diff received from the Golomb-Rice decoding circuit 101, parameters A' and Bγ are calculated by the calculation formula A'=A+|Diff| and Bγ=Bγ+Diff. When the value of N is equal to a threshold value Th1, N, A and Bγ are multiplied by ½. The threshold value Th1 is used to limit the values of N, A and Bγ within a specific range, and is designated in advance (e.g., Th1=64). Then, N is updated by calculating N'=N+1.

Figure 5:
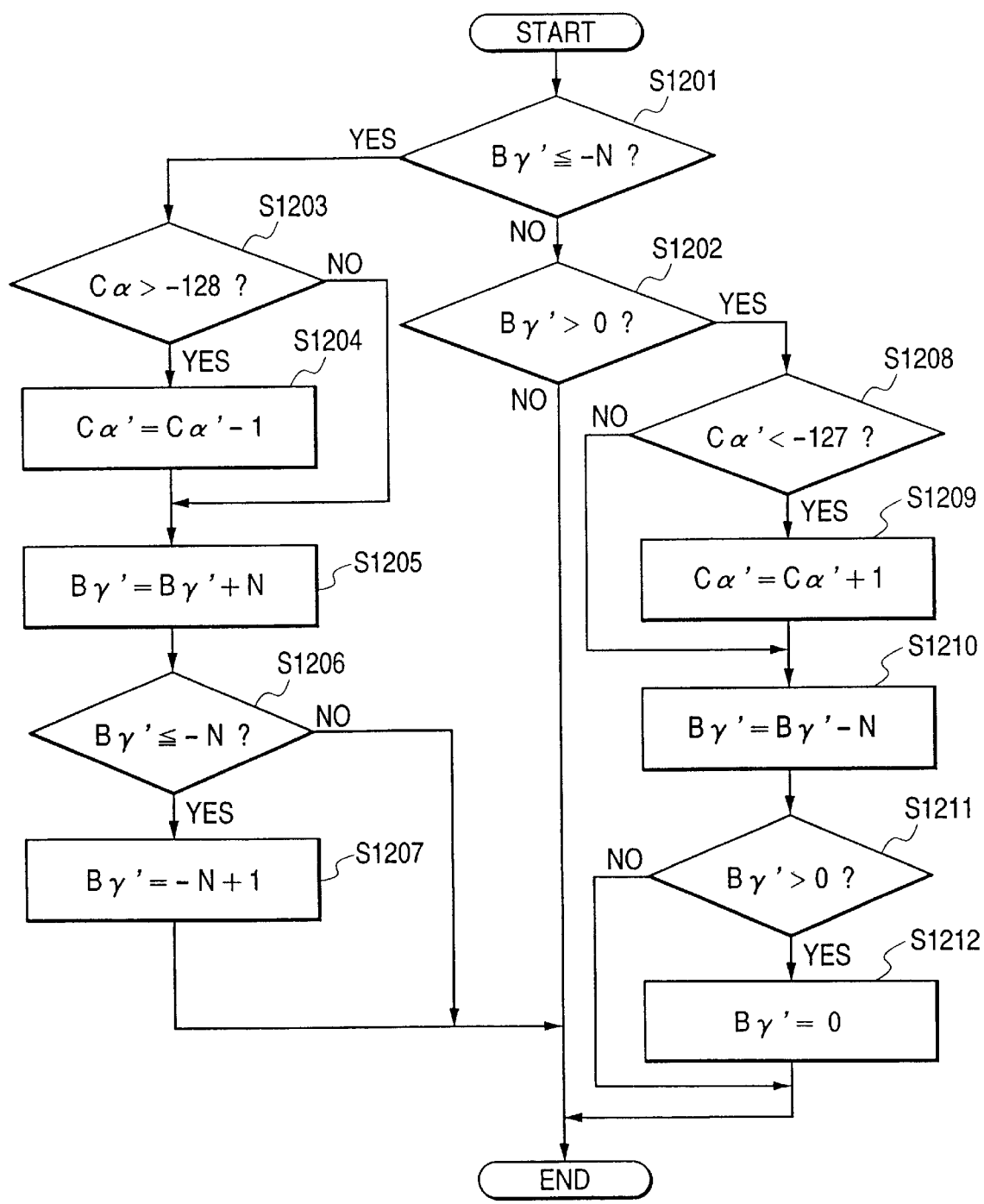
FIG. 5 is a flowchart showing the processing for updating a prediction correction value Cα.

FIG. 5 is a flowchart showing the processing for updating the prediction correction value Cα. When the value of Cα is substituted into Cα', at STEP 1201 a check is performed to determine whether the parameter Bγ' is equal to or smaller than −N. When the value of the parameter Bγ' is equal to or smaller than −N, program control advances to STEP 1203. If the value of the parameter Bγ' is greater than −N, program control moves to STEP 1202.

At STEP 1203, the value of Cα' is compared with −128. When the value of Cα' is greater than 0128, Cα' is decremented by 1 (STEP 1204).

Then, the value N is added to Bγ' (STEP 1205). When the value of Bγ' is equal to or smaller than −N, the value for Bγ' is set so that Bγ'=−N+1 (STEP 1206 and STEP 1207).

At STEP 1202, Bγ' is compared with 0. When the value of Bγ' is equal to or greater than 0, program control goes to STEP 1208. When the value of Bγ' is smaller than 0, the updating processing is terminated.

At STEP 1208, Cα' is compared with 127. When the value of Cα' is smaller than 127, Cα' is incremented by 1 (STEP 1209), and then, N is subtracted from Bγ' (STEP 1210). When the value of Bγ' is equal to or greater than 0, the value for Bγ' is set so that Bγ'=0 (STEP 1211 and STEP 1212).

The finally obtained parameters N', A', Bγ' and Cα' are written to the address of one of the memories 202 to 210 that is selected using the above selection process, and the four parameters N, A, Bγ and Cα in the status S are replaced with the new ones.

It should be noted that to selectively write data to one of the memories 202 to 210, the memory write control unit 201 provides the same address control as is provided for the reading process. Further, an address signal that is used for reading is also employed as an address signal for writing.

In this embodiment, the parameter updating circuit 213 outputs the parameters to all the memories 202 to 210; however, a memory used for writing is actually determined based on a control signal that is transmitted to each memory.

Specifically, a write control signal is transmitted to each memory, and a write control signal having a value 1 is received only by the one memory that is selected for reading.

For example, since the first memory 202 is selected when |Q3|=3, a write signal for the memory 202 is generated from a signal in which |Q3|=0 has been detected. For the detection of |Q3|, a three-input NOR logical element is employed to determine whether the three bits representing |Q3| are all zero.

Since the second memory 203 is selected when |Q3|=1 and the phase flag R21=the phase flag R3, a write signal to memory 203 is generated by using the logical product of a signal in which |Q3|=1 has been detected and the matching output of the phase flags R21 and R3 (an inverted output of an exclusive-OR element).

Since the third memory 204 is selected when |Q3|=1 and the phase flag R21≠the phase flag R3, a write signal to the memory 204 is generated by using the logical product of a signal in which |Q3|=1 has been detected and the non-matching output of the phase flags R21 and R3 (an output of an exclusive-OR element).

Similarly, for the fifth to ninth memories 205 to 210, the value of |Q3| and the matching/non-matching output of the phase flags R21 and R3 are employed to generate a write signal.

It should be noted that a write signal actually transmitted to the memory is a signal obtained by masking (a logical product calculation), for each of the nine control signals, a memory write pulse that has a memory write timing.

The k parameter generating circuit 212 in FIG. 2 receives the parameters A and N corresponding to one status S, which is selected and output by the selector 211, and employs these parameters to generate the k parameter that is required for Golomb-Rice decoding.

Specifically, the value of the k parameter that satisfies the condition $\min(k|N\times 2^k \geq A)$. It should be noted that $\min(a|b)$ is the minimum a that satisfies the condition b.

The obtained k parameter is output to the Golomb-Rice decoding circuit 100 at the succeeding stage.

In the above described manner, the memory storing unit 106 outputs the k parameter and the parameter Cα. The processing performed by the predicting device 104 will now be described. First, the predicting device 104 obtains, from the buffer 102, the values of the peripheral pixels a, b and c (see FIG. 3 for the positional relationship) of the object pixel to be encoded. A prediction value p is then generated based on the pixel values a, b and c. The prediction value p is obtained using the following equation.

$$p = \begin{cases} \max(a, b); & \text{when } \min(a, b) > c \\ \min(a, b); & \text{when } \max(a, b) < c \\ a + b - c; & \text{for a case other than those above} \end{cases}$$

The thus obtained prediction value p is output to the error feedback circuit 105.

The error feedback circuit 105 corrects the prediction value p by using the parameter Cα generated by the memory storing unit 106 (i.e., a prediction correction value that is appropriate for the status S of a specific peripheral pixel), and generates a corrected prediction value p'.

Specifically, when the phase flag R received from the status generating unit 103 is 0, p'=p+Cα; and when the phase flag R is 1, p'=p−Cα. Further, when p' is smaller than 0, p'=0; and when p' is equal to or greater than 255, p'=255.

The phase flag R has the following value.

$$R = \begin{cases} 1; & \text{phase flag } R3 = 1, \text{ or } Q3 = 0 \text{ and phase flag } R2I = 1 \\ 0; & \text{other cases} \end{cases}$$

The Golomb-Rice decoding circuit 100 employs the k parameter to decode the difference data Diff received from the input unit 108. The decoding process includes the following two steps:

(1) decoding a non-negative integer value V by using Golomb-Rice code (coded data); and (2) converting the non-negative integer value V into difference data. The conversion equation used follows.

$$\text{Diff} = \begin{cases} V/2; & \text{when } V \text{ is an even number} \\ -(V+1)/2; & \text{when } V \text{ is an odd number} \end{cases}$$

The process for decoding the non-negative integer value V from Golomb-Rice code is performed in the following manner.

First, the first k bits of the Golomb-rice code (coded data) are extracted as lower k bits of V. Then, the number of "0" bits following the k bits is counted until a "1" bit appears, and the obtained count value is defined as an upper bit of V.

This process will be explained by using an example. When k=2 and Golomb-Rice code="010001", the fist two bits "01" of this code are defined as the lower two bits of V. Then, the run length of "0" in the remaining bit string "0001" is counted. In this case 3="11", which is regarded as the upper bit data of V. Therefore, V="1101"=13.

FIG. 6 is a diagram showing the relationship between the Golomb-Rice code and a non-negative integer value V relative to k=0, 1 and 2.

The decoded non-negative integer value V is converted into difference data Diff using process (2).

In this case, since V is an odd number, −(v+1)/2 is calculated and Diff=−7 ="111111001" (nine bits).

The difference data Diff, the phase flag R and the corrected prediction value p' are employed to reconstruct the pixel data that existed before encoding was performed by the pixel data reconstructing circuit 101. The reconstructed pixel data (object pixel) is calculated using the following equation.

$$\text{reconstructed pixel data} = \begin{cases} p' + \text{Diff}; & \text{when phase flag } R = 0 \\ p' - \text{Diff}; & \text{when phase flag } R = 1 \end{cases}$$

The thus reconstructed pixel data are transmitted to the buffer 102 and are stored therein in order to reconstruct the next object pixel to be decoded.

By using the above described decoding method, an encoded color or monochrome multi-valued image can be completely reconstructed, without losing any amount of information.

Further, when, as in the embodiment, it is necessary to generate parameters, such as the k parameter and the prediction correction value Cα, based on a plurality of peripheral pixel values a, b, c and d, the count of the necessary parameters (N, A, Bγ and Cα) that are prepared is equivalent to the status number Q3 that is determined from the value a of a peripheral pixel positioned immediately before the object value x, so that the parameters can be selected and output as soon as the value a is obtained. Therefore, the parameter reading or writing time required for decoding can be reduced, and the overall decoding process speed can be increased.

Modification

The present invention may be applied as one part of a system that is constituted by a plurality of apparatuses (e.g., a host computer, an interface device, a reader and a printer), or as a part of an individual apparatus (e.g., a copier or a facsimile machine).

Further, the present invention is not limited to the apparatuses or the methods used to implement the above embodiments, but can also include a case where software program code for implementing the previous embodiments is supplied to a computer (or to a CPU or an MPU) in an apparatus or in a system, and in consonance with the program, the computer in the system or in the apparatus can operate various devices to accomplish the above embodiments.

In this case, the program code read from the storage medium performs the functions assigned to the embodiments, and the program code and the means for supplying the program code to the computer, specifically, the storage medium on which such program code is recorded, constitutes the present invention.

A storage medium for supplying such program code can be, for example, a floppy disk, a hard disk, an optical disk, a magneto-optical disk, a CD-ROM, a magnetic tape, a nonvolatile memory card, or a ROM.

In addition, the present invention includes not only the case where the functions in the previous embodiments can be performed by the computer reading and executing program code, but also the case where, in accordance with an instruction in the program code, an OS (Operating System) running on the computer performs part, or all, of the actual processing.

Furthermore, the present invention includes a case where program code, read from a storage medium, is written in a memory mounted on a function expansion board that is inserted into a computer, or that is inserted into a function expansion unit connected to a computer, and in consonance with a program code instruction, a CPU mounted on the function expansion board, or in the function expansion unit, performs part, or all, of the actual processing in order to implement the functions included in the above described embodiments.

Operation by an Encoding Side

Figure 7:
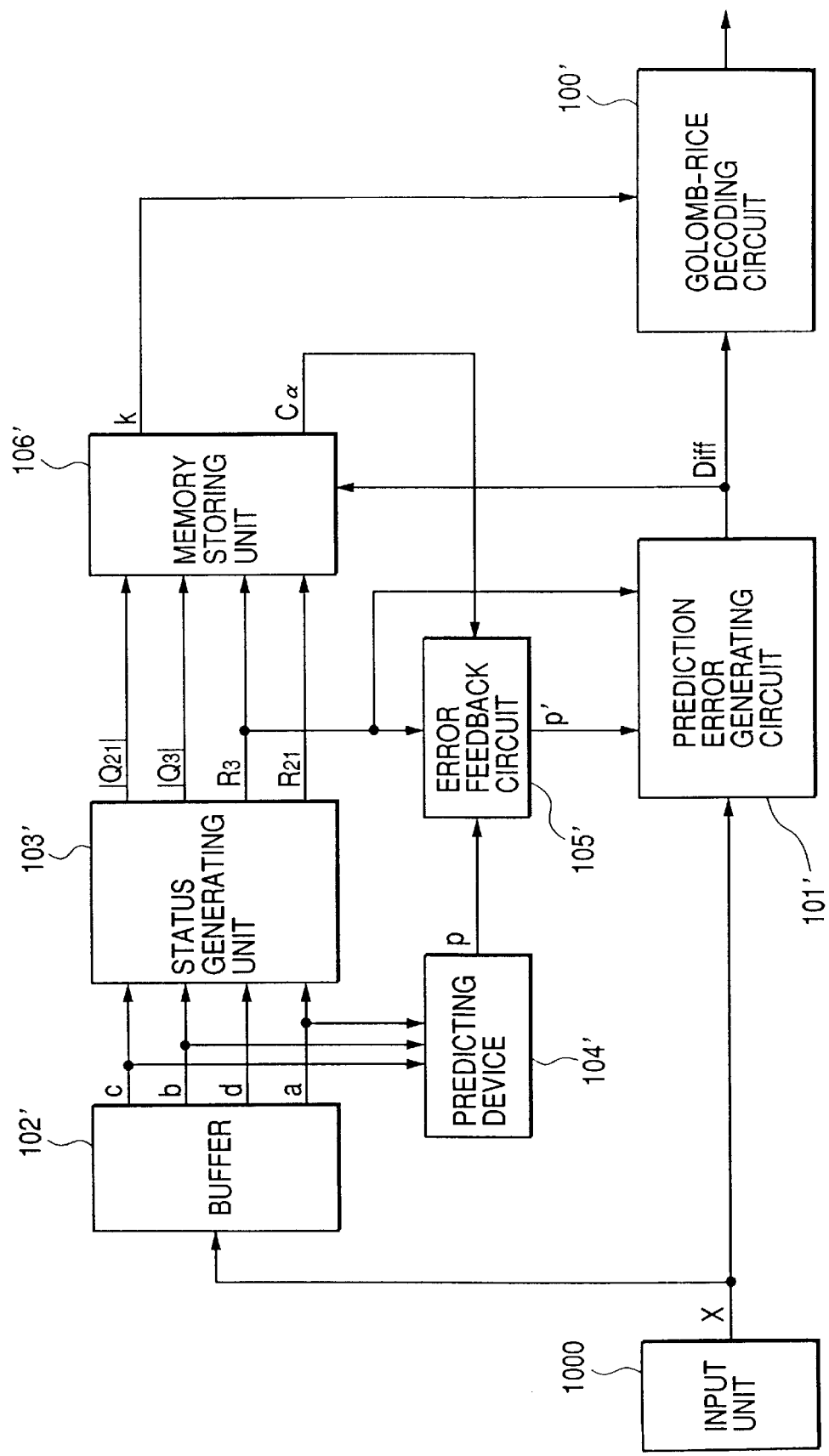
FIG. 7 is a block diagram showing an encoding apparatus.

While referring to FIG. 7, a brief explanation will now be given for the processing performed when generating the coded data received by the input unit 108 in FIG. 1. Basically, in FIG. 7 a prediction error generating circuit 101' and a Golomb-Rice encoding circuit 100' perform operations the opposite of those performed by the pixel data decoding circuit 101 and the Golomb-Rice decoding circuit 100 in FIG. 1; a buffer 102', a status generating circuit 103', a predicting device 104', an error feedback circuit 105' and a memory storing unit 106' perform the same processing as the buffer 102, the status generating unit 103, the predicting device 104, the error feedback circuit 105 and the memory storing unit 106 in FIG. 1; and an input unit 1000 receives object pixels x to be encoded and sequentially transmits them to a succeeding stage.

First, the object pixels x are sequentially input to the input unit 1000 in the order used for raster scanning, and are transmitted to the prediction error generating circuit 101' and the buffer 102'.

The object pixels x are input to the buffer 102', and are stored and held in two lines. Since there is no preceding line for the first line of an image to be encoded, the initial value of the buffer 102' is set to 0.

Then, from the image data for two lines stored in the buffer 102', the pixel values a, b, c and d, which correspond to the peripheral pixels of the object pixel x that is to be encoded by the prediction error generating circuit 101', are output to the succeeding stage. The positional relationship of the peripheral pixels having the values a, b, c and d, and the order in which these pixels are input are shown in FIG. 3.

Of the pixel values a, b, c and d output from the buffer 102', the values a, b, c and d are transmitted to the status generating unit 103', while the values a, b and c are transmitted to the predicting device 104'. The status generating unit 103' generates a status number |Q21|, which represents the status of the peripheral pixel of the object pixel x; a phase flag R21, which represents the phase of the status number |Q21|; a status number |Q3|; and a phase flag R3, which represents the phase of the status number |Q3|, and outputs them to the succeeding stage.

The method used for generating these status numbers and the phase flags has already been explained above.

The arrangement of the memory storing unit 106 in FIG. 2 is also employed for the memory storing unit 106'.

The predicting device 104' receives, from the buffer 102', the values a, b and c of the peripheral pixels of the object pixel x, and employs these values to generate a prediction value p. The method used for generating the prediction value p has already been described above.

At the succeeding stage, the thus obtained prediction value p is transmitted to the error feedback circuit 105'.

The error feedback circuit 105' uses the parameter Cα generated by the memory storing unit 106' to correct the prediction value p (i.e., an appropriate prediction correction value for the status S of a specific peripheral pixel), and generates a corrected prediction value p'.

The prediction error generating circuit 101' calculates a difference between the object pixel x and the corrected prediction value p', and generates a prediction difference Diff. When the phase flag R=0, Diff=x−p', and when the phase flag R=1, Diff=p'−x.

At the succeeding stage, the prediction difference Diff obtained by the prediction error generating circuit 101' is output to the Golomb-Rice encoding circuit 100'.

The Golomb-Rice encoding circuit 100' employs the following formula to convert, into a non-negative integer value V, the prediction difference Diff that is obtained by the prediction error generating circuit 101'.

$$V = |-2 \times Diff - 1|; \text{ when } Diff < 0$$
$$|2 \times Diff|; \text{ when } Diff \geq 0$$

Then, based on the k parameter, Golomb-Rice coding is performed for the integer value V. An explanation will now be given for the Golomb-Rice encoding of the non-negative integer value V based on the k parameter.

First, the non-negative integer V is changed to a binary expression. Then, the binary value is divided into a lower k bit portion and an upper bit portion. Following this, "0" bits, in a number that is equivalent to the count obtained when the upper bit portions are represented using the decimal system, are added to the lower k bit portions. Finally, a "1" bit is added to obtain a coded word.

The coded data (Golomb-Rice code) obtained by the Golomb-Rice encoding circuit 100' is output to the decoding device in FIG. 1.

The performance of the encoding processing has been explained.

As is described above, according to the present invention, a decoding process employing peripheral pixels can be performed rapidly, and in particular, rapid decoding can be implemented while taking into account the timing to be used for obtaining the values of peripheral pixels.

The present invention can be variously modified within the scope of the following claims.

What is claimed is:

1. A decoding apparatus, which decodes each pixel based on a plurality of peripheral pixels, comprising:

a plurality of memories for storing a predetermined parameter necessary for decoding, which corresponds to a set of first and second statuses that are obtained from a specific pixel;

determination means for determining a read address in each of said plurality of memories based on a third status obtained from peripheral pixels other than said predetermined peripheral pixel; and selection means for inputting said first and said second statuses obtained from said predetermined pixel and for selecting one of said plurality of memories in accordance with said inputting first and second statuses, wherein said first status indicates a value based on an absolute value of a difference value between said predetermined peripheral pixel and an other peripheral pixel, and wherein said second status indicates a value based on a positive or negative code of the difference value between said predetermined peripheral pixel and the other peripheral pixel.

2. A decoding apparatus according to claim 1, wherein one of said plurality of peripheral pixels is a pixel positioned immediately before an object pixel to be decoded.

3. A decoding apparatus according to claim 1, wherein said third status indicates a value based on an absolute value of a difference value between peripheral pixels other than said predetermined peripheral pixel.

4. A decoding apparatus according to claim 1, wherein said selection means selects one of said plurality of memories in accordance with a fourth status obtained using a peripheral pixel other than said predetermined peripheral pixel.

5. A decoding method, whereby each pixel is decoded based on a plurality of peripheral pixels, comprising the steps of:

holding, in a plurality of memories, a set of first and second statuses that are obtained from a specific pixel and storing a predetermined parameter necessary for decoding;

determining a read addresses in each of said plurality of memories based on a third status obtained from peripheral pixels other than said predetermined peripheral pixel; and inputting said first and said second statuses obtained from said predetermined pixel and selecting one of said plurality of memories in accordance with said inputted first and second statuses, wherein said first status indicates a value based on an absolute value of a difference value between said predetermined peripheral pixel and an other peripheral pixel, and wherein said second status indicates a value based on a positive or negative code of the difference value between said predetermined peripheral pixel and the other peripheral pixel.

* * * * *